United States Patent Office 3,494,116
Patented Feb. 10, 1970

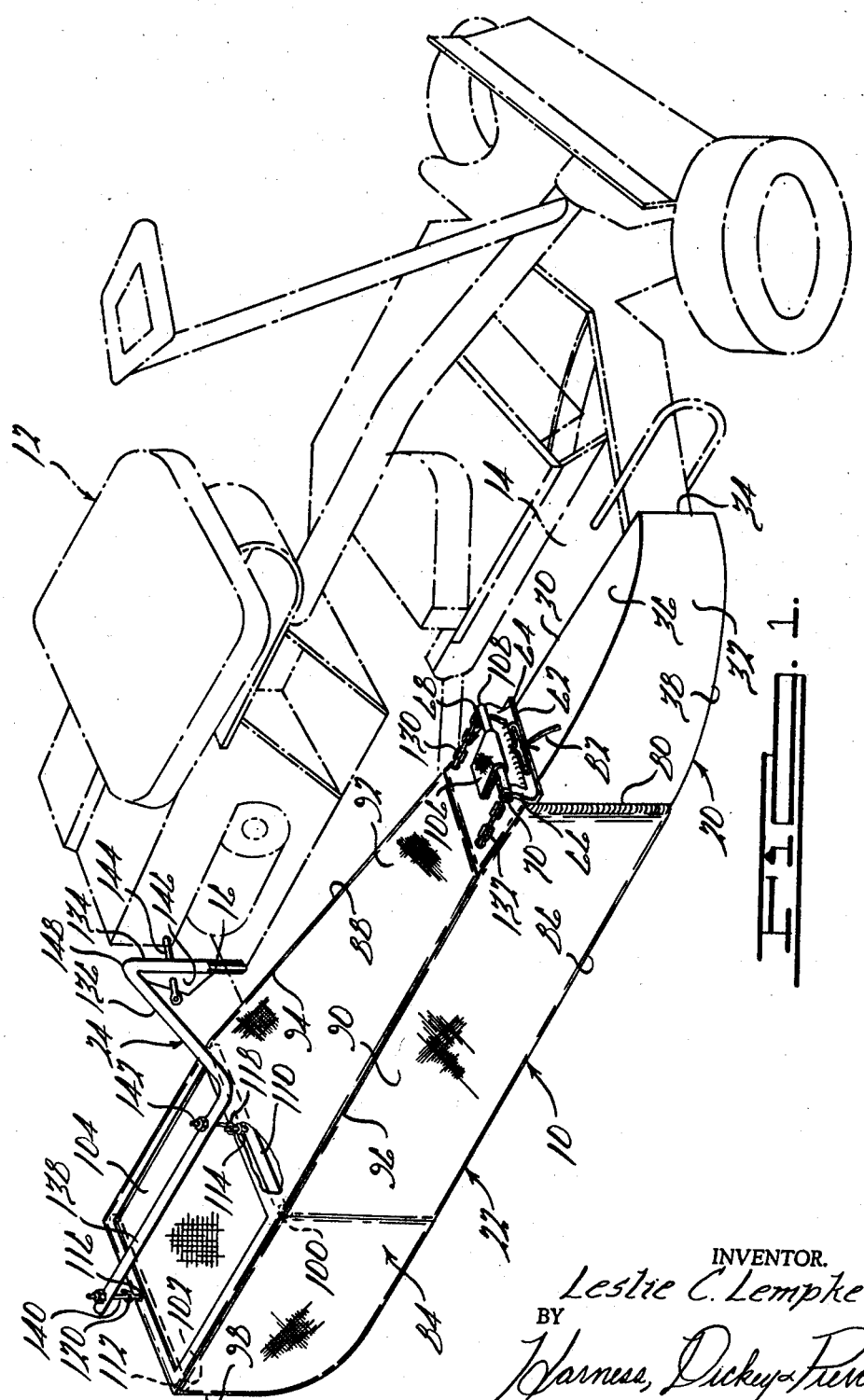

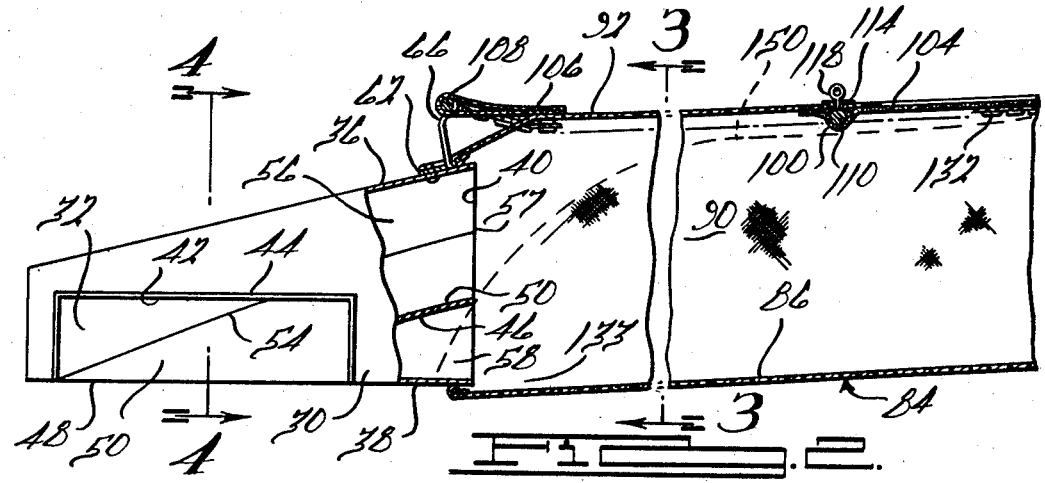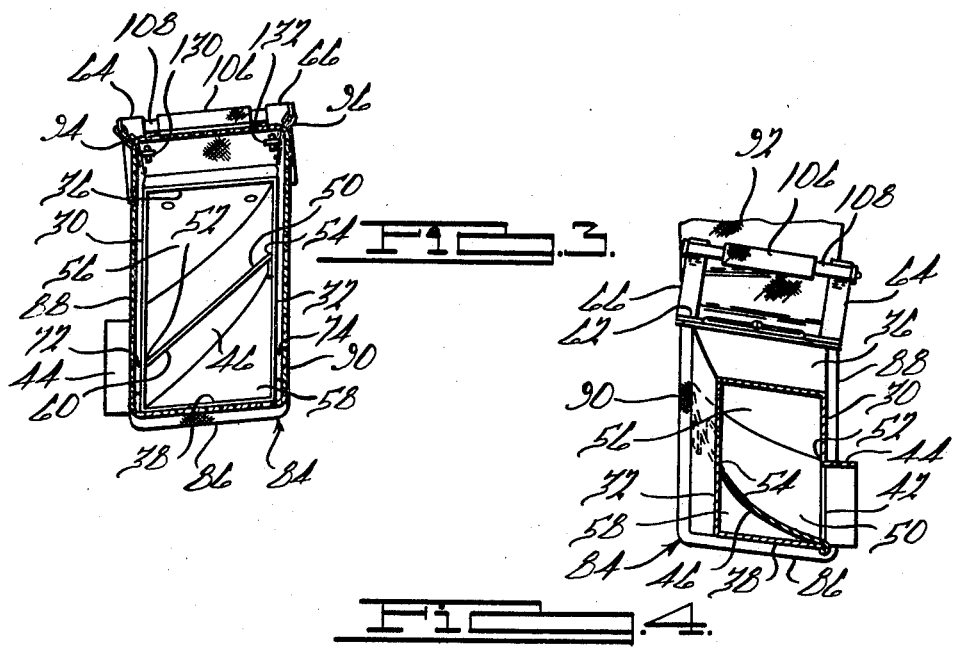

3,494,116
GRASS CATCHER WITH TENSIONABLE SUSPENSION MEANS
Leslie C. Lempke, 1445 Kirkway,
Bloomfield Hills, Mich. 48013
Filed Aug. 25, 1966, Ser. No. 574,961
Int. Cl. A01d 35/22
U.S. Cl. 56—202                  40 Claims

ABSTRACT OF THE DISCLOSURE

There is herein disclosed material catching apparatus for use with a mower or the like comprising collapsible bag means formed from cloth-like material having bag tensioning support means and being associated with discharge chute means to provide an air path along the top of the bag and a material accumulation chamber therebelow.

---

This invention relates to lawn or garden vehicles such as power mowers and more particularly to grass and/or leaf catching apparatus for use therewith.

It is now common practice to provide grass catcher apparatus in connection with power rotary mowers of the type which have either a side discharge opening or a top discharge opening. One of the common types of grass catching apparatus includes a discharge chute which is attached to the mower about the discharge opening and provides a rearwardly extending discharge passage. A cloth bag, having a drawstring mounted about an inlet opening of the bag, is commonly suspended from the mower with the inlet opening secured about the rear of the discharge passage on the chute by the drawstring.

One of the problems with the aforementioned type of apparatus is clogging of the discharge passage in the discharge chute and at the inlet opening of the bag by the grass or leaves being discharged from the mower. In addition, as the discharged material accumulates, the flow of the discharged material often becomes impedded by accumulation of the material immediately adjacent the inlet opening in the bag. Thus, as the bag is filled, the rate of discharge of material into the bag and the amount of material discharged is often substantially lessened. As a result, the full capacity of the bag is seldom utilized and often substantial amounts of material fall beneath the mower adjacent the discharge opening as the discharge passage becomes blocked. When the capacity of the bag for holding an accumulating material is not fully utilized, the bag must be emptied more often and consequently the time required for mowing any given size area is increased with the attendant inconvenience involved in repeated removal and remounting of the bag.

One of the objects of the present invention is to provide new and improved material catching apparatus for use with power mowing apparatus or the like.

Another object of the present invention is to provide a new and improved catcher bag.

Still another object of the present invention is to provide a new and improved discharge chute.

A still further object is to provide a new and improved discharge chute and bag and suspension combination.

Referring now to the drawings, an illustrative embodiment of the catcher apparatus utilizing the inventive principles is shown and referred to in detail in the following specification by reference to the drawings wherein:

FIGURE 1 is a schematic perspective view of a power mower with catcher apparatus embodying the invention attached thereto;

FIG. 2 is a partial side elevational view, with parts broken away, of the catcher apparatus of FIG. 1;

FIG. 3 is a cross-sectional view taken along the line 3—3 in FIG. 2; and

FIG. 4 is a cross-sectional view taken along the line 4—4 in FIG. 2.

Referring now to FIG. 1, catcher apparatus 10 embodying the inventive concepts is shown in association with a power mower 12 of the type which is adapted to be ridden by the operator. The power mower in the illustrative embodiment of the invention is of the type manufactured by the McDonough Power Equipment Company and known as a "Snapper Comet." The mower is provided with a deck portion 14 having a side discharge opening through which materials such as grass clippings or leaves are discharged in a stream of relatively high velocity air and has a vertically extending support bar 16 at the rear utilized in the present invention in a manner to be hereinafter described in detail. It is to be understood that the inventive principles are applicable to other types of power mowers including both push-type and ride-type mowers. Furthermore, the inventive principles may also be utilized in alternative embodiments of the invention adapted for use with specific makes and types of mowers or related equipment, such as for example, leaf raking equipment or the like.

IN GENERAL

The catcher apparatus comprises discharge chute means 20 in the form of a housing suitably mounted on the deck portion 14 about the mower discharge opening so as to enable materials to be discharged therethrough.

A container means 22 is mounted on the rear of the chute means and extends rearwardly along the side of the mower. A hanger means 24 supports the container means in spaced relationship to the mower above the ground.

THE DISCHARGE CHUTE MEANS

The discharge chute means 20 is, in the illustrative embodiment, in the form of a sheet metal housing having a flat vertically extending inner side wall portion 30 extending along the adjacent side of the mower. A vertically extending outer side wall portion 32 curves outwardly and rearwardly from a point of intersection 34 with the inner side wall portion. At least a substantial portion of the outer side wall portion is curved rearwardly. In the illustrative embodiment, the outer side wall portion is curved from the front intersection 34 to the rear of the housing. A top wall portion 36 and a bottom wall portion 38 extend between the side wall portions 30, 32 and, together therewith, define a housing chamber and a rearwardly facing housing opening 40 at the rear of the housing. The rear edges of the wall portions define the opening 40 and provide wall portions over which the inlet opening of the bag is received and on which the drawstring means is held. The height of the housing chamber gradually increases from a minimum near the inlet opening to a maximum at the rear opening. The transverse cross-sectional configuration of the chamber is in the form of a parallelogram. The upward outward inclination of the bottom portion provides operating clearance beneath the housing. An inlet opening 42 is formed in the side wall portion 30 and includes a laterally extending attachment flange portion 44. Suitable fastening means (not shown) are provided on the flange portion to attach the housing to the mower about the mower discharge opening and may take the form of mating holes and corresponding threaded fastening devices.

The discharge housing is provided with a guide plate 46 extending from the bottom of the inlet opening at 48 rearwardly and upwardly to the housing opening 40. The guide plate 46 is upwardly curved so as to provide a continuous curved upwardly facing guide surface 50 extending between the inlet opening and the rear opening. The edges 52, 54 of the guide plate are securely fastened to the side walls 30, 32. The edge 54, attached to the outer side wall 32, terminates at a level well above the level whereat the side surface 52 is attached to corresponding parts of the side wall 30. Thus, the guide plate, as viewed in FIGS. 3 and 4, is inclined upwardly and outwardly at an acute angle of, for example, approximately 30 to 45 degrees. The discharge housing is divided by the guide plate into a discharge passage 56, extending between inlet opening 42 and a discharge opening 57, and an accumulation chamber 58 having a purpose to be hereinafter described in detail. In the preferred embodiment, the rear end of the guide plate has an increased curvature such as to provide a lip portion 60 having a lift surface facing upwardly and forwardly toward the inlet opening of the discharge chute.

A bag attaching bracket 62 is mounted on the top of the discharge chute adjacent the discharge opening by suitable fastening means. The bracket extends beyond the side walls of the housing and is provided with upwardly extending leg portions 64, 66 which terminate in forwardly opening semi-circular support rod seats 68, 70. In order to provide for additional support for the housing, a support element (not shown) in the form of a chain or the like may be connected at one end to the leg portion 64 and provided with a catch at the other end which may be secured to a portion of the mower.

A pair of bag attaching flanges 72, 74 are mounted on the side walls of the discharge chute so that the drawstring of the bag may be abutted thereon.

THE CONTAINER MEANS

The container means 22, in the illustrative embodiment, is in the form of a collapsible bag made out of suitable cloth-like material which is relatively limp and shapeless without external support. When supported, the bag has a generally U-shaped cross-sectional configuration beyond the inlet opening 80 which has a drawstring 82 extending therearound. In the illustrative embodiment, the bag is formed by a main material portion 84, defining the bottom 86 and side walls 88, 90 of the bag. A flat cover portion 92 is secured to the main portion along seams 94, 96. The rear of the bag is closed by a back wall portion 98 of generally rectangular configuration. The height of the top wall portion above the bottom of the bag decreases from front to rear so that the U-shaped bottom portion tapers rearwardly upwardly when suspended.

Support rod pockets 100, 102, FIG. 2, are formed intermediate the ends of the bag and at the rear end of the bag adjacent the front and rear edges of a generally rectangular-shaped air discharge outlet 104. A mesh screen-type material covers the air discharge opening to permit the air to be discharged while retaining the material in the bag. A rod loop 106 is sewn to the front top portion of the bag behind the bag opening 80.

THE BAG SUPPORT AND TENSIONING MEANS

Support rod means in the form of dowel elements 108, 110, 112, for example, are mounted in the rod pockets 100, 102 and in the rod loop 106 and provide front, rear, and central crossbar means extending substantially from side to side on the flat upper bag portion 92. The rod pockets 100, 102 are provided with centrally located eyelets 114, 116. Hanger rings 118, 120 are centrally attached to the support rods 110, 112 and extend upwardly through the eyelets. Rod 108 extends through the bag loop 106 and outwardly beyond the side edges thereof within the rod seats 68, 70 provided in the flanges 64, 66.

Bag tensioning means in the form of lengths of link chain or rope-like material suspension elements 130, 132 are attached at one end to the ends of the support rod 108 by suitable fastening means and extend rearwardly therefrom through eyelets in the top of the bag adjacent the seams 94, 96 into the bag. The tensioning elements continue rearwardly within the bag along the seams 94, 96 and are attached to the ends of the intermediate support rod 110 and ends of the rear support rod 112. The suspension elements also may be in the form of a non-stretchable cord such as Dacron and may be mounted internally or externally of the bag.

The bag is hung on the mower by the rings 118, 120 in the support rods 110, 112. When the bag is thus suspended, tension is exerted on the extendable suspension elements 130, 132 and on the bag through the suspension elements and the support rods to maintain the bag in a tensioned position having the generally U-shaped cross-sectional configuration throughout. The tension on the bag is caused by spacing the front crossbar means from the rear crossbar means a distance such as to create the desired tension in the bag.

THE AIR DISCHARGE PASSAGE MEANS AND COLLECTION CHAMBER

The top front of the bag is suspended well above the top of the discharge opening 57 of the chute, as shown in FIG. 2, and the top of the bag extends rearwardly above the top of the chute discharge opening 57. The bag area beneath the top wall of the bag defines a discharge passage means extending rearwardly from the chute discharge opening 57 to the air discharge opening 104 in the bag which remains open until the bag is substantially filled. Guide plate 50 is arranged so as to direct the discharging air upwardly toward the top of the bag.

Thus, the discharge chute means, which is divided by plate 46 into a discharge passage chamber and an accumulation chamber, is effective, in combination with the bag, to divide the bag into a collection chamber at the bottom of the bag and air passage means at the top of the bag. An air path extends from the discharge opening in the chute means upwardly and rearwardly to the air discharge opening in the bag. An accumulation chamber 133 is formed at the front lower portion of the bag by the location of the front lower portion of the bag in spaced relaionship beneath the guide plate. While, in the illustrative embodiment, an accumulation chamber is also formed in the lower rear portion of the housing chamber, only the accumulation chamber formed by the front bottom portion of the bag below the guide plate may be used.

One of the features of the present bag is that it may be folded and rolled into a compact bundle when not in use while being capable of being relatively rigidly suspended in use in a manner defining an accumulation chamber and air passage therethrough of relatively constant predetermined configuration.

BAG HANGER MEANS

The bag hanger means 24 is in the form of a one-piece tubular member bent to form a vertical support portion 134, a transverse horizontal portion 136 extending outwardly from the mower, and a horizontal suspension portion 138 extending rearwardly alongside the mower. Hanger hooks 140, 142 are mounted on the rearwardly extending portion at suitably spaced intervals for receiving the rings 118, 120 of support rods 110, 112. The tubular support portion 134 is of a size adapted to be telescopically mounted over the support bar 16 of the mower. Abutment and positioning means, in the form of a threaded adjustment device 144 mounted in a flange 146 on the tubular member, may be provided for engagement with an adjacent surface of the mower to hold the bag in any outwardly adjusted position along the side of the mower. The rod 16 vertically locates the hanger means by abutting engagement at the bend area 148. The hanger is preferably designed to hold the center of the bag in general alignment with the outer side wall 32 of the chute along which the material being discharged tends to accumulate. The desired alignment may be obtained by aligning the suspension portion 138 with the outer side wall 32.

ASSEMBLY

The apparatus is assembled by mounting the discharge chute means on the mower in alignment with the discharge opening of the mower. The manner of mounting the discharge chute in the mower will vary depending on the type of mower and the configuration of the discharge opening. In the illustrative embodient, the top of flange 44 rests on the top of the adjacent mower deck 14 and is fastened thereto by suitable threaded fastening devices attached to the mower deck for that purpose. The side walls of the flange 44 provide lateral stability and a closed connection between the mower discharge opening and the chute discharge passage. The rear of the discharge chute may be further supported by any suitable means such as a chain element attached at full length to the side of the mower. Obviously, the manner of supporting the housing may be varied as necessary or desirable depending upon the type of mower being utilized.

The bag hanger means 24 is mounted on the rear of the mower with the rod 16 being telescopically received in the tubular support portion 134 and extending upwardly within the tubular portion. The portion 136 extends transversely of the mower a length sufficient to provide clearance for supporting the bag alongside the mower. The suspension portion 138 extends rearwardly alongside the mower to position the support hangers 140, 142 in a location whereat the bag will be suspended in a tensioned condition causing the interior of the bag to be relatively fully opened along its entire length. The length of the suspension portion may be varied as required to accommodate varying size bags.

The front support rod 108 of the bag is mounted on the flange seats 68, 70 and the mouth of the bag is placed around the rear end of the discharge chute with the drawstring located on the front side of the flanges 72, 74. Then the drawstring may be drawn tight and tied so that the mouth of the bag is held in close engagement about the periphery of the rear end of the discharge chute in spaced relationship both above and below the discharge opening 57.

Then the rings 118, 120 on the support rods 110, 112 are brought into supporting engagement with hooks 140, 142 on the bag hanger 24. The spacing of the rings on the bag and the hooks on the hanger is such that the suspension elements 130, 132 are held in tension rearwardly of the discharge chute means. The bag is also tensioned through loop 106 and the rod pockets 100, 102. The bag is held fully open between the suspension elements which, along with rods 110, 112, provide positive support around the air discharge opening.

The bag may be removed to empty the contents in use by simply undoing the drawstring, removing the bag from the chute, and lifting the bag off of the suspension hooks.

OPERATION

In operation, the relatively high velocity air and suspended materials, discharged from the mower through its discharge opening, flow into the discharge passage in the discharge chute means. The air and materials are then guided rearwardly and upwardly through the chute discharge passage means and out of the chute discharge opening. The upwardly curved guide plate causes the air and materials to be discharged from the chute discharge opening in an upwardly, slightly inwardly, and rearwardly directed flow path. The materials being discharged tend to be swept along the outer wall 32 and the guide plate 46 to the upturned lip 60 which directs the air and material upwardly toward the top of the bag and causes the material to be carried a maximum distance rearwardly before dropping onto the bottom of the bag. The flow of air toward the air discharge opening at the top rear of the bag is such as to cause the material to be disposed rearwardly along the bottom of the bag with the top of the bag remaining open to continue to permit the air and the materials to be blown into the bag. The accumulation chamber at the rear of the discharge chute and the bottom front of the bag prevents material accumulating in the bag from covering the discharge opening and adversely affecting the flow path of the air. The general arrangement of the material when the bag has been substantially filled is shown by the dotted line 150 in FIG. 2. It may be seen that the capacity of the bag for holding material is maximized. The bag fills uniformly until only a small air passage remains at the top of the bag and only a small area of the upper front portion of the bag, opposite the discharge opening, remains open. Thus, material-air separation means are provided by the container and chute arrangement which are effective to maintain the flow of the relatively high velocity air at the front and top and along the length of the container while collecting material at the rear and bottom of the container until the container is substantially filled with material along the entire length thereof.

The invention claimed is:

1. Material catching apparatus for use with a power mower or the like from which materials are discharged in a stream of relatively high velocity air comprising:
    removable collapsible bag type container means for catching the materials discharged from the mower, and including top, bottom, rear, and side surface portions,
    a variable area inlet opening forming means at one end of said container means, and a constant area air outlet opening at the opposite end, said container means being of closed cloth-like construction throughout except for said variable area inlet opening and said air outlet opening which constitutes a top rear portion of said container means extending substantially from side to side of said container means,
    discharge chute means for association with a power mower,
    a mower discharge opening at one end of said chute means,
    a chute discharge opening at the other end of said chute means
    said discharge chute means having wall portions adjacent said chute discharge opening,
    means for holding said inlet opening forming means of said container means on said wall portions about the periphery of said chute means adjacent said chute discharge opening, and
    means locating the upper portion of said container means adjacent the chute discharge opening in upwardly spaced relationship above the chute discharge opening to establish a flow path of air from the one end to the other end along the top of the container means.

2. The invention as defined in claim 1 and wherein said discharge chute means includes guide plate means extending upwardly and rearwardly from the mower discharge opening to said chute discharge opening, said guide plate means terminating intermediate the adjacent top and bottom portions of said container means and said chute means and providing an accumulation chamber at the bottom of said container means beneath said chute discharge opening.

3. The invention as defined in claim 2 and wherein said guide plate means is rearwardly upwardly curved and inclined toward said container means and outwardly upwardly inclined away from the mower discharge opening.

4. The invention as defined in claim 2 and wherein said guide plate means is provided with an upwardly turned discharge lip.

5. The invention as defined in claim 1 and said container means having a U-shaped bottom and side wall cross-sectional configuration.

6. Container means for catching grass or the like in a stream of air discharged from a rotary mower or the like and comprising:
   a collapsible bag of cloth-like material,
   an inlet opening at one end and a discharge opening at the other end of the bag, and
   transversely spaced tensionable and collapsible rope-like bag tensioning means extending longitudinally along each side of said bag between and on opposite sides of the inlet opening and discharge opening.

7. The invention as defined in claim 6 and said bag tensioning means extending substantially the length of said bag from said inlet opening to the rear of the bag.

8. The invention as defined in claim 7 and wherein said bag is provided with transversely extending support rod means extending from side to side of said bag and being connected to said rope-like bag tensioning means at the sides of said bag.

9. The invention as defined in claim 8 wherein said support rod means being connected to said bag means and having hanger elements for supporting said bag and said rope-like bag tensioning means in an elongated tensioned condition.

10. The invention as defined in claim 8 and said bag being closed except for said inlet opening at the front and said air discharge opening located in a top rear portion, said support rod means comprising a front support rod associated with said bag at the top front of said bag rearwardly of said inlet opening, an intermediate support rod on the front side of said air discharge opening, and a rear support rod on the rear side of said air discharge opening, and said bag tensioning means being attached to said support rod means.

11. The invention as defined in claim 7 and said bag having bottom and side wall portions of generally U-shaped cross-sectional configuration, a flat top wall portion extending between said side wall portions, an air exhaust opening formed in the rear of the top wall portion, and the height of the top wall portion above the bottom wall portion decreasing from the inlet opening at the front of the bag toward the rear of the bag.

12. In combination with a lawn or garden vehicle such as a power mower having a discharge opening through which materials are discharged in a stream of relatively high velocity air:
   discharge chute means attached to said vehicle and receiving the materials suspended in the stream of relatively high velocity air;
   chute discharge passage means extending upwardly and rearwardly from the vehicle discharge opening;
   material collecting collapsible bag means formed from cloth-like material and removably attached to said chute means and receiving and collecting materials suspended in the stream of relatively high velocity air;
   air discharge passage means formed along the top of said bag means above said chute discharge passage means and extending substantially the length of said bag means to maintain flow of the relatively high velocity air at the top and along the length of said container means while collecting material at the bottom of said container means until said container means is substantially filled with material along the entire length thereof;
   hanger means mounted on said vehicle and attached to and suspending said bag means in a material collecting position;
   longitudinally extending bag tensioning support means extending along the top of said bag means and being located in spaced relationship at the sides of said air discharge passage means and holding said bag means in tension between said discharge chute means and said hanger means in a material collecting position and maintaining said air discharge passage means in an open condition to permit continuous unimpeded flow of the relatively high velocity air from the discharge chute means along the top of the bag means;
   bag attaching means associated with an inlet opening at the front of said bag means and the rear of said discharge chute means and removably attaching said bag means to said discharge chute means with the bag inlet opening mounted about the rear of said discharge chute means in communication with said chute discharge passage means and holding said bag means against rearward displacement and enabling said bag means to be rearwardly tensioned;
   transversely extending bag support means located rearwardly from the bag inlet opening and being attached to said bag means and to said longitudinally extending bag tensioning support means; and
   connecting means attached to said transversely extending bag support means and being connected to said hanger means and being located and spaced so as to rearwardly tension said bag means and said longitudinally extending bag support means and holding said bag means in the material collecting position and positively maintaining said bag discharge passage means in an open position.

13. The invention as defined in claim 12 and said discharge chute means comprising:
   an inlet opening facing the vehicle discharge opening,
   a rearwardly facing chute discharge opening,
   said chute discharge passage means extending through said discharge chute means and connecting said inlet opening to said rearwardly facing chute discharge opening and being formed by a bottom wall extending upwardly and rearwardly and terminating at said rearwardly facing chute discharge opening at a higher elevation than at said inlet opening.

14. The invention as defined in claim 13 and having material accumulation chamber means located adjacent said rearwardly facing chute discharge opening and beneath said bottom wall of said chute discharge passage means.

15. The invention as defined in claim 14 and both said bag support means attached to the upper portions of said bag means adjacent the bag inlet opening and adjacent said rearwardly facing chute discharge opening and holding the upper portions of said bag means in upwardly spaced relationship above said rearwardly facing chute discharge opening.

16. The invention as defined in claim 15 and said transversely extending bag support means comprising:
   loop means attached to the top of said bag means and extending upwardly and forwardly therefrom toward said discharge chute means,
   transverse rod means holding said loop means, and
   rod support means on said discharge chute means holding said rod means and tensioning said loop means and said bag means.

17. The invention is defined in claim 16 and said bag tensioning support means comprising a pair of extensible elements attached at the front end of said rod means and at the rear of said transverse bag support means.

18. The invention as defined in claim 17 and said extensible elements extending into said bag means adjacent said loop means and extending rearwardly within said bag means.

19. The invention as defined in claim 18 and said bag means having a relatively flat upper wall with spaced generally parallel side edges located closely adjacent and extending generally parallelly along said extensible elements.

20. The invention as defined in claim 19 and having an air discharge opening formed in the top wall at the rear of said bag means.

21. The invention as defined in claim 20 and said transversely extending support means comprising a pair of spaced support rod means located adjacent the front and rear edges of said air discharge opening, and said extensible elements being connected to said support rod means and extending along the side edges of said air discharge opening to positively support said bag means about said air discharge opening.

22. The invention as defined in claim 13 and said bottom wall having an upwardly curved deflecting lip at the rearwardly facing discharge opening.

23. The invention as defined in claim 12 and said discharge chute means comprising:
a housing having oppositely located upper and lower walls and oppositely located side walls defining a housing chamber and a rearwardly facing opening at the rear of said housing chamber,
a side facing inlet opening formed at the front of said housing and communicating with the vehicle discharge opening,
an internally mounted guide plate extending from the bottom of said side facing inlet opening within said housing to said rearwardly facing opening at the rear of said housing and terminating in between said upper and lower walls and dividing said housing into upper and lower compartments,
sad upper compartment forming said chute discharge passage means and terminating in a rearwardly facing discharge opening, and
said lower compartment forming a bag holding means for maintaining the bottom of the bag means below the bottom of said rearwardly facing discharge passage means and defining a material accumulation chamber preventing clogging of the discharge passage means.

24. The invention as defined in claim 23 and said guide plate being upwardly and rearwardly curved from said inlet opening to said discharge opening.

25. The invention as defined in claim 12 and said hanger means being formed by tube means having a transversely extending vertical mounting portion mounted on said vehicle and extending upwardly away from said vehicle, a transversely extending horizontal spacing portion extending outwardly away from said vehicle, and a longitudinally extending horizontal suspension portion extending along the side of said vehicle.

26. The invention as defined in claim 25 and said vehicle having a vertically extending mounting rod means located at the rear of said vehicle, and said mounting portion of said tube means being telescopically mounted thereon.

27. The invention as defined in claim 26 and said suspension portion extending rearwardly along said vehicle.

28. The invention as defined in claim 26 and said mounting portions being pivotally movable relative to said vehicle about a vertical axis, and adjustment means associated with said mounting portion to vary the position of said suspension portion relative to said vehicle.

29. In combination with a lawn or garden vehicle such as a power mower,
an upwardly and rearwardly extending discharge chute on the mower having a chute discharge opening through which materials are discharged in a stream of relatively high velocity air,
a removable collapsible collecting bag means having variable area inlet opening forming means at the front end and a discharge opening at the rear end,
said bag means including top, bottom, rear, and side surface portions and being of closed cloth-like construction throughout except for said inlet opening and said discharge opening which constitutes a top rear portion of said bag means extending substantially from side to side of said bag means,
said discharge chute having wall portions adjacent said chute discharge opening,
means for holding said inlet opening forming means of said bag means on said wall portions about the periphery of said discharge chute adjacent said discharge chute opening,
front support and spreading means for said bag means located above said discharge opening and carried by said mower,
a front portion of the bag means adjacent the inlet opening being attached to and held by said front support and spreading means above said discharge opening,
rear support and spreading means for said bag located above and rearwardly of said discharge opening adjacent the rear end of the bag means,
and a rear portion of the bag means adjacent the air discharge opening being attached to said rear support and spreading means, and the length of the bag means between said front portion and said rear portion and the spacing of the front support and spreading means and the rear support and spreading means being such as to tension and spread the bag means therebetween and hold the bag means in an open condition therebetween.

30. The invention as defined in claim 29 and wherein said front support means comprises transversely extending rod means located above said discharge chute.

31. The invention as defined in claim 30 and wherein said rear support means also comprises a transversely extending rod means.

32. The invention as defined in claim 31 and there being spaced rearwardly extending rope-like tensionable suspension means extending between the front and rear support means and being held in tension therebetween to hold said bag means in an open condition.

33. Container means for catching grass or like material suspended in a stream of air discharged from a power mower or the like, comprising:
a normally limp collapsible bag of cloth-like material having a front end and a rear end spaced rearwardly therefrom, a variable area inlet opening at the front end of said bag,
drawstring means associated with said inlet opening to hold the front end of the bag adjacent the inlet opening in engagement with a power mower discharge opening chute,
a substantially flat upper bag surface extending between the ends of the bag,
first bag tensioning means attached to said bag at one side of said upper bag surface, and
second bag tensioning means attached to said bag at another side of said upper bag surface opposite said one side and being operative with said first bag tensioning means to suspend the bag with the flat upper bag surface in a tensioned condition causing the interior of the bag to be relatively fully opened along its entire length.

34. The invention as defined in claim 33 and wherein the first bag tensioning means is attached to the front of the bag and the second bag tensioning means is attached to the rear of the bag.

35. The invention as defined in claim 33 and wherein each of said bag tensioning means comprises a rod loop attached to said bag, a support rod means mounted in said rod loop, and mower attachment means on said support rod means.

36. The invention as defined in claim 34 and wherein the rod loop and the rod means extend transversely across the length of the bag.

37. The invention as defined in claim 33 and further comprising:
an air discharge opening in said bag, and
a mesh screen-type material covering said opening and permitting air to be discharged while retaining material carried in the air in the bag.

38. The invention as defined in claim 37 and wherein:
said first bag tensioning means is attached to said bag adjacent and in upward spaced relationship to said air inlet opening, and said second bag tensioning means is attacehd to said bag adjacent said aid discharge opening.

39. The invention as defined in claim 38 and wherein: said air discharge opening is located in said flat upper bag surface, and said second bag tensioning means is located in rearwardly spaced relationship to said air discharge opening.

40. In the combination of a power mower with rearwardly extending grass catcher apparatus mounted thereon:

a power mower having an air discharge passage, a collapsible and tensionable normally limp cloth-like grass catcher bag having a variable area air inlet opening at the front end thereof, the bag having a normal limp collapsed storage position and a tensioned open grass catching position providing a closed grass catching chamber therewithin extending from the front to the rear of the bag and defined by a bottom bag surface and side bag surfaces and a substantially flat upper bag surface, drawstring means mounted about said air inlet opening and releasable holding the front of the bag adjacent the inlet opening around the air discharge passage, front cross bar means extending substantially from side to side of the flat upper bag surface and terminating adjacent the sides of the bag and being centrally attached to the upper front part of the bag in spaced relationship to the inlet opening, front support means attached to the mower and rigidly holding the front cross bar means and the upper front part of the bag, rear cross bar means separate from said front cross bar means and extending substantially from side to side of the flat upper bag surface and being centrally attached to the upper rear part of the bag and terminating adjacent the sides of the bag and, rear support means separate from said front support means and attached to the mower and rigidly holding the rear cross bar means and upper rear part of the bag, the front cross bar means and front support means being spaced from the rear cross bar means and rear support means a distance such as to create tension in the upper bag surface and hold the bag in the tension open grass catching position.

References Cited

UNITED STATES PATENTS

| | | | |
|---|---|---|---|
| 2,295,981 | 9/1942 | White | 55—381 |
| 2,855,744 | 10/1958 | Phelps | 56—202 |
| 2,905,963 | 9/1959 | Boyer. | |
| 3,099,123 | 7/1963 | Price | 56—202 |
| 3,143,842 | 8/1964 | Mattson et al. | 56—202 |
| 3,165,877 | 1/1965 | Leader et al. | 56—202 |
| 3,193,997 | 7/1965 | Allina | 56—202 |
| 3,367,091 | 2/1968 | Weiland | 56—202 X |

FOREIGN PATENTS 200,137  11/1955  Australia.

F. BARRY SHAY, Primary Examiner

P. A. RAZZANO, Assistant Examiner